(12) United States Patent
Flanagin et al.

(10) Patent No.: US 7,149,813 B2
(45) Date of Patent: Dec. 12, 2006

(54) METHOD AND SYSTEM FOR SYNCHRONIZING MOBILE DEVICES

(75) Inventors: Stephen D. Flanagin, Sammamish, WA (US); Brian Moore, Sammamish, WA (US); Greg Friedman, Redmond, WA (US); Frank Stephen Serdy, Sammamish, WA (US); Salim Alam, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 869 days.

(21) Appl. No.: 09/930,659

(22) Filed: Aug. 14, 2001
(Under 37 CFR 1.47)

(65) Prior Publication Data

US 2003/0046434 A1 Mar. 6, 2003

(51) Int. Cl.
*G06F 15/16* (2006.01)
*G06F 12/00* (2006.01)

(52) U.S. Cl. ............... 709/248; 707/203; 713/400
(58) Field of Classification Search ........... 707/203; 713/400; 702/89; 715/500.1; 718/102; 714/707, 775, 789, 798; 370/324, 350, 510, 370/512, 513, 514; 375/240.28, 240.29, 375/357, 363, 364, 365, 366

See application file for complete search history.

(56) References Cited

U.S. PATENT DOCUMENTS

| | | | |
|---|---|---|---|
| 5,727,002 A | 3/1998 | Miller et al. | 371/32 |
| 6,839,564 B1* | 1/2005 | Sutinen et al. | 455/502 |
| 2003/0069874 A1* | 4/2003 | Hertzog et al. | 707/1 |

FOREIGN PATENT DOCUMENTS

JP 2000020370 A * 1/2000

OTHER PUBLICATIONS

SyncML Representation Protocol, Version 1.0.1, Published Jun. 15, 2001, pp. 1-105.*

Awerbuch et al., "Time Optimal Self-Stabilizing Synchronization", *Proceedings of the Twenty-Fifth Annual ACM Symposium on the Theory of Computing*, San Diego, CA, May 16-18, 1993, pp. 652-661.

Carter et al., "Techniques for Reducing Consistency-Related Communication in Distributed Shared-Memory Systems", *ACM Transactions on Computer Systems*, vol. 13, No. 3, Aug. 1995, pp. 205-243.

Bianchini et al., "Hiding Communication Latency and Coherence Overhead in Software DSMs", *Proceedings of the Seventh International Conference on Architectural Support for Programming Languages and Operating Systems*, Cambridge, MA, Oct. 1-5, 1996, pp. 198-209.

"*SyncML Sync Protocol*, version 1.0.1"; Jun. 15, 2001; 61 pgs; http://www.syncml.org/docs/syncml_protocol_v101_20010615.pdf.

(Continued)

*Primary Examiner*—John Follansbee
*Assistant Examiner*—Ashok Patel
(74) *Attorney, Agent, or Firm*—Merchant & Gould P.C.; Ryan T. Grace

(57) ABSTRACT

A protocol for synchronizing data is provided. Additionally, a system and method of using the protocol are also provided. The protocol allows responses to be grouped with commands in a single XML document. It provides a command for requesting a single object be sent without requiring that all unsynchronized objects be sent. It provides a command for specifying how many objects at a time should be sent and a response that indicates that more objects are available to be sent. It provides a means for arbitrarily extending the protocol in application-specific ways. It provides a means for sending updates while requesting that no updates be sent back.

37 Claims, 12 Drawing Sheets

OTHER PUBLICATIONS

*SyncML Representation Protocol*, version 1.0.1"; Jun. 15, 2001; 105 pgs.; http://www.syncml.org/docs/syncml_represent_v101_20010615.pdf.

Iren, S. et al., "The Transport Layer: Tutorial Survey", ACM Computing Surveys, vol. 31, No. 4, Dec. 1999, pp. 360-405.

Tanenbaum, A., "Computer Networks", Prentice-Hall, Upper Saddle River, New Jersey, 1996, pp. 412-417 and pp. 524-529.

Ericsson et al., "SyncML HTTP Binding, Version 1.0", SyncML Specification, Dec. 7, 2000, pp. 1-19.

Jeon, W. S., "Improved Selective Repeat ARQ Scheme for Mobile Multimedia Communications", IEEE Communications Letters, vol. 4, No. 2, Feb. 2000, 3 pgs.

Telecommunications Industry Association, "Data Service Options for Wideband Spread Spectrum Systems: Radio Link Protocol Type 2", TIA/EIA/IS-707-A.8, Mar. 1999, 438 pgs.

Rabinovich, M. et al., "RaDaR: a scalable architecture for a global Web hosting service", Computer Networks, Elsevier Science Publishers, vol. 31, Nos. 11-16, May 17, 1999, pp. 1545-1561.

Kelly, B., "Request for Comments 2355: TN3270 Enhancements", IETF Standard, Internet Engineering Task Force, IETF, Jun. 1998, pp. 1-39.

* cited by examiner

XML Protocol Schema

```
<xsd:schema xmlns:xsd="http://www.w3.org/2000/08/XMLSchema">
  <xsd:annotation>
    <xsd:documentation>
    Microsoft schema for Synchronization protocol
    Copyright 2000 Microsoft, All rights reserved
    </xsd:documentation>
  </xsd:annotation>
```

FIG. 1A

```
<xsd:element       name="Sync" type="SyncType" />

<xsd:complexType name="SyncType" >
  <xsd:sequence>
    <xsd:element   name="Version"    type="xsd:decimal" />
    <xsd:element   name="Status"     type="xsd:positiveInteger" />
    <xsd:element   name="Collections" type="CollectionsType" />
  </xsd:sequence>
</xsd:complexType>

<xsd:complexType name="CollectionsType" >
  <xsd:element name="Collection"       type="CollectionType"
               maxoccurs="unbounded"/>
</xsd:complexType>

<xsd:complexType name="CollectionType" >
  <xsd:element name="Class"         type="xsd:string" />
  <xsd:element name="SyncKey"       type="xsd:positiveInteger" />
  <xsd:element name="CollectionId"  type="xsd:positiveInteger"   minoccurs="0"
  <xsd:element name="Options"       type="xsd:CDATA"             minoccurs="0"
  <xsd:element name="Commands"      type="CommandsType"          minoccurs="0"
  <xsd:element name="Responses"     type="ResponsesType"         minoccurs="0"
  <xsd:element name="Status"        type="xsd:positiveInteger" />
  <xsd:element name="GetChanges"                                 minoccurs="0"
  <xsd:element name="WindowSize"    type="xsd:positiveInteger"   minoccurs="0"
  <xsd:element name="MoreAvailable"                              minoccurs="0"
</xsd:complexType>
```

```
<xsd:complexType name="CommandsType" >
    <xsd:element name="Add"    type="CAddType"    minoccurs="0" maxoccurs="unbounded"/>
    <xsd:element name="Delete" type="CDeleteType" minoccurs="0" maxoccurs="unbounded"/>
    <xsd:element name="Change" type="CChangeType" minoccurs="0" maxoccurs="unbounded"/>
    <xsd:element name="Fetch"  type="CFetchType"  minoccurs="0" maxoccurs="unbounded"/>
</xsd:complexType>

<!--Need different types for commands and responses since responses has status -->

<xsd:complexType name="ResponsesType" >
    <xsd:element name="Add"    type="RAddType"    minoccurs="0" maxoccurs="unbounded"/>
    <xsd:element name="Delete" type="RDeleteType" minoccurs="0" maxoccurs="unbounded"/>
    <xsd:element name="Change" type="RChangeType" minoccurs="0" maxoccurs="unbounded"/>
    <xsd:element name="Fetch"  type="RFetchType"  minoccurs="0" maxoccurs="unbounded"/>
</xsd:complexType>

<!--For commands -->

<xsd:complexType name="CAddType" >
    <xsd:element name="ClientId"        type="xsd:positiveInteger"  minoccurs="0"
    <xsd:element name="ServerId"        type="xsd:positiveInteger"  minoccurs="0"
    <xsd:element name="ApplicationData" type="xsd:CDATA" />
</xsd:complexType>

<xsd:complexType name="CDeleteType" >
    <xsd:element name="ServerId"        type="xsd:positiveInteger" />
</xsd:complexType>

<xsd:complexType name="CChangeType" >
    <xsd:element name="ServerId"        type="xsd:positiveInteger" />
    <xsd:element name="ApplicationData" type="xsd:CDATA" />
</xsd:complexType>

<xsd:complexType name="CFetchType" >
    <xsd:element name="ServerId"        type="xsd:positiveInteger" />
</xsd:complexType>
```

*FIG. 1B*

```xml
<!--For responses -->

<xsd:complexType  name="RAddType" >
  <xsd:element  name="ClientId"      type="xsd:positiveInteger" />
  <xsd:element  name="ServerId"      type="xsd:positiveInteger" />
  <xsd:element  name="Status"        type="xsd:positiveInteger" />
</xsd:complexType>

<xsd:complexType  name="RDeleteType" >
  <xsd:element  name="ServerId"      type="xsd:positiveInteger" />
  <xsd:element  name="Status"        type="xsd:positiveInteger" />
</xsd:complexType>

<xsd:complexType  name="RChangeType" >
  <xsd:element  name="ServerId"      type="xsd:positiveInteger" />
  <xsd:element  name="Status"        type="xsd:positiveInteger" />
</xsd:complexType>

<xsd:complexType  name="RFetchType" >
  <xsd:element  name="ServerId"         type="xsd:positiveInteger" />
  <xsd:element  name="Status"           type="xsd:positiveInteger" />
  <xsd:element  name="ApplicationData"  type="xsd:CDATA" />
</xsd:complexType>

</xsd:schema>
```

FIG. 1C

Update XML Document

```xml
<Sync xmlns="AirSync:" xmlns:c="POOMCONTACTS:">
  <Version>0.2</Version>
  <Collections>
    <Collection>
      <Class>Contacts</Class>
      <SyncKey>5432109876</SyncKey>
      <CollectionId>1</CollectionId>
      <WindowSize>3</WindowSize>
      <GetChanges />
      <Options>
        <FilterType>1</FilterType>
        <Truncation>1024</Truncation>
      </Options>
      <Commands>
        <Add>
          <ClientId>0123456789</ClientId>
          <ApplicationData>
            <c:FirstName>Joe</c:FirstName>
            <c:categories>
              <c:category>Buddies</c:category>
            </c:categories>
          </ApplicationData>
        </Add>
        <Delete>
          <ServerId>9876543210</ServerId>
        </Delete>
```

*FIG. 2A*

```xml
<Change>
        <ServerId>0123456789</ServerId>
        <ApplicationData>
          <c:MiddleName>Moe</c:MiddleName>
          <c:categories>
            <c:category>Buddies</c:category>
          </c:categories>
          <c:LastName>Schmoe The Man</c:LastName>
          <c:CompanyName />
        </ApplicationData>
      </Change>
      <Fetch>
        <ServerId>1122334455</ServerId>
      </Fetch>
    </Commands>
  </Collection>
</Collections>
</Sync>
```

*FIG. 2B*

Response XML Document

```
<Sync xmlns="AirSync:" xmlns:c="POOMCONTACTS:">
  <Version>0.2</Version>
  <Collections>
    <Collection>
      <Class>Contacts</Class>
      <SyncKey>5432109876</SyncKey>
      <CollectionId>1</CollectionId>
      <MoreAvailable />
      <Responses>
        <Change>
          <ServerId>0123456789</ServerId>
          <Status>4153602</Status>
        </Change>
        <Add>
          <ClientId>0123456789</ClientId>
          <ServerId>9876543210</ServerId>
          <Status>4153200</Status>
        </Add>
        <Delete>
          <ServerId>9876543210</ServerId>
          <Status>4153999</Status>
        </Delete>
        <Fetch>
          <ServerId>1122334455</ServerId>
          <Status>4153200</Status>
          <ApplicationData>*DATA*</ApplicationData>
        </Fetch>
      </Responses>
```

*FIG. 3A*

```xml
<Commands>
  <Add>
    <ServerId>2233445566</ServerId>
    <ApplicationData>
      <c:FirstName>Jeff</c:FirstName>
      <c:categories>
        <c:category>Buddies</c:category>
      </c:categories>
    </ApplicationData>
  </Add>
  <Delete>
    <ServerId>4455667788</ServerId>
  </Delete>
  <Change>
    <ServerId>5566778899/ServerId>
    <ApplicationData>
      <c:MiddleName>Henry</c:MiddleName>
      <c:categories>
        <c:category>Buddies</c:category>
      </c:categories>
      <c:LastName>Shoemaker</c:LastName>
      <c:CompanyName />
    </ApplicationData>
  </Change>
</Commands>
  </Collection>
 </Collections>
</Sync>
```

*FIG. 3B*

METHOD AND SYSTEM FOR SYNCHRONIZING MOBILE DEVICES

FIELD OF THE INVENTION

The present invention relates generally to computer-executable software, and more particularly synchronizing electronic devices.

BACKGROUND

Interest in synchronizing personal digital data has grown since mobile devices were introduced. One early approach to synchronizing personal data required a user to update the data on a personal computer (PC). The PC in turn synchronized the data with servers. To update the mobile device when leaving the office required the user to re-input the data manually on the mobile device.

As the mobile device market matured, master-slave replication systems were developed to synchronize the data. A master-slave replication system would take data from the master device, the PC, and replicate it to the slave device, the mobile device. Usually, this avoided the need to input the data in the PC and then to manually re-input the data into the mobile device. Sometimes, however, a user would have to input the data on both devices. For example, if the user was out of the office and wanted to update information on the mobile device, the user could manually enter the data into the mobile device. Before synchronization with the PC, however, the user would have to re-input the same data into the PC to avoid having the changes made on the mobile device overwritten.

Eventually, two-way synchronization techniques were developed. Using these techniques a user could update information either on the PC or the mobile device. Then, to synchronize the data, the two devices were connected and information was exchanged. This technique was generally satisfactory until the devices were separated by a high latency, low bandwidth, and/or low reliability network, such as a wireless or cellular network.

With wireless networks, the risk that a connection will be lost is several times greater than with non-wireless systems. Some synchronization techniques address potential interruption by sending acknowledgments at certain points while a message is received. Sending multiple acknowledgments, however, exacerbates other problems in cellular networks. Typically, cellular networks have high latency. Each transmission is subject to this latency. Thus, using acknowledgments may increase the total synchronization time which gives rise to a greater potential for interruption by, for example, an unreliable network.

Additionally, cellular networks often have relatively low bandwidth. Synchronizing a relatively small number of objects between a PC and a mobile device over a cellular network may require several minutes; synchronizing many objects may require hours. This problem is typically not faced by devices directly connected or connected through a local area network.

Thus, there is a need in the art for a method of synchronizing data on devices connected by high latency, low bandwidth, and/or unreliable networks.

SUMMARY

The present invention provides a system and method for synchronizing devices that may be connected by high latency, low bandwidth, and/or unreliable networks. A protocol is provided which avoids the latencies of multiple acknowledgments by placing responses to a number of synchronization activities in a single message. Requests and responses to previous requests may be grouped together in one message. Selected objects may be synched without requiring that all objects be synched. A window size may be set to limit the number of objects synched during a single transaction. The protocol is designed to allow either the server or the mobile device to begin the synchronization.

In one aspect of the invention, the protocol groups responses for requests to update objects. Grouping the responses together avoids some of the latency of responding to each update request.

In another aspect of the invention, the protocol allows responses to updates to be grouped together and sent with grouped requests to update objects. Thus, instead of multiple messages being sent during synchronization, one message can both report errors and send, request, and respond to updates. This reduces latency in synchronization and generally reduces bandwidth required.

In another aspect of the invention, the protocol enables a mobile device to request a particular object or folder be retrieved from the server without synchronizing other items. For example, a user may have a subject line from an email and desire to obtain the rest of the email. Rather than requiring the user to complete a synchronization of all objects, the protocol allows the mobile device to request only the rest of the email from the server and that the server mark the email as synchronized.

In yet another aspect of the invention, the protocol enables a mobile device to send changes to a server and request that no changes be sent back. This allows a user to sync and send an email without requiring the user to wait while other items are synchronized.

In another aspect of the invention, the protocol enables a mobile device to set a window size for updates sent from a server. For example, a user may desire to set a limit on how many objects are sent from a server for updating in any particular transaction. The protocol allows the mobile device to request that the server only send a limited number of objects to be updated. This allows the user or an algorithm on the mobile device to decide when the additional objects should be updated. Changing the window size may also be used, for example, to adapt to connection conditions. A relatively small window size may be used when the connection is less reliable to decrease the data that is resent when a connection is broken. Conversely, a larger window size may be used when the connection is more reliable to decrease the overhead of multiple transmissions to perform a synchronization.

In another aspect of the invention, the protocol allows the server to indicate that more objects are available to be updated. For example, a server may have more objects than can be sent within a window size set by the mobile device. After sending the objects that may be sent within a window size, the protocol allows the server to indicate that more objects are available to be updated.

In another aspect of the invention, the protocol avoids using additional bandwidth during transmission by reporting failed, but not reporting successful, object synchronizations.

In another aspect of the invention, the protocol allows for synchronization messages to be sent out of band. That is, the server and the mobile device may synchronize some objects without using the protocol. For example, the server may send an urgent message to the mobile device outside of the protocol. The protocol does not rely on it being the only mechanism by which synchronization messages are sent.

The invention may be used to synchronize devices using cellular networks, email, direct connections, the Internet, http, ftp, or other transmission protocols. Because it can "ride" on top of transmission protocols, it can take advantage of the security of the protocol upon which it travels. The protocol is extensible and allows devices to embed data or additional commands to be used when communicating with each other.

BRIEF DESCRIPTION OF THE DRAWINGS

FIGS. 1A–1C illustrate one exemplary syntax of a protocol for synchronizing devices;

FIGS. 2A and 2B illustrate an exemplary XML document sent by a client to synchronize data;

FIGS. 3A and 3B illustrate an exemplary XML document sent in response to the XML document illustrated in FIGS. 2A and 2B;

DETAILED DESCRIPTION

Figure 4:
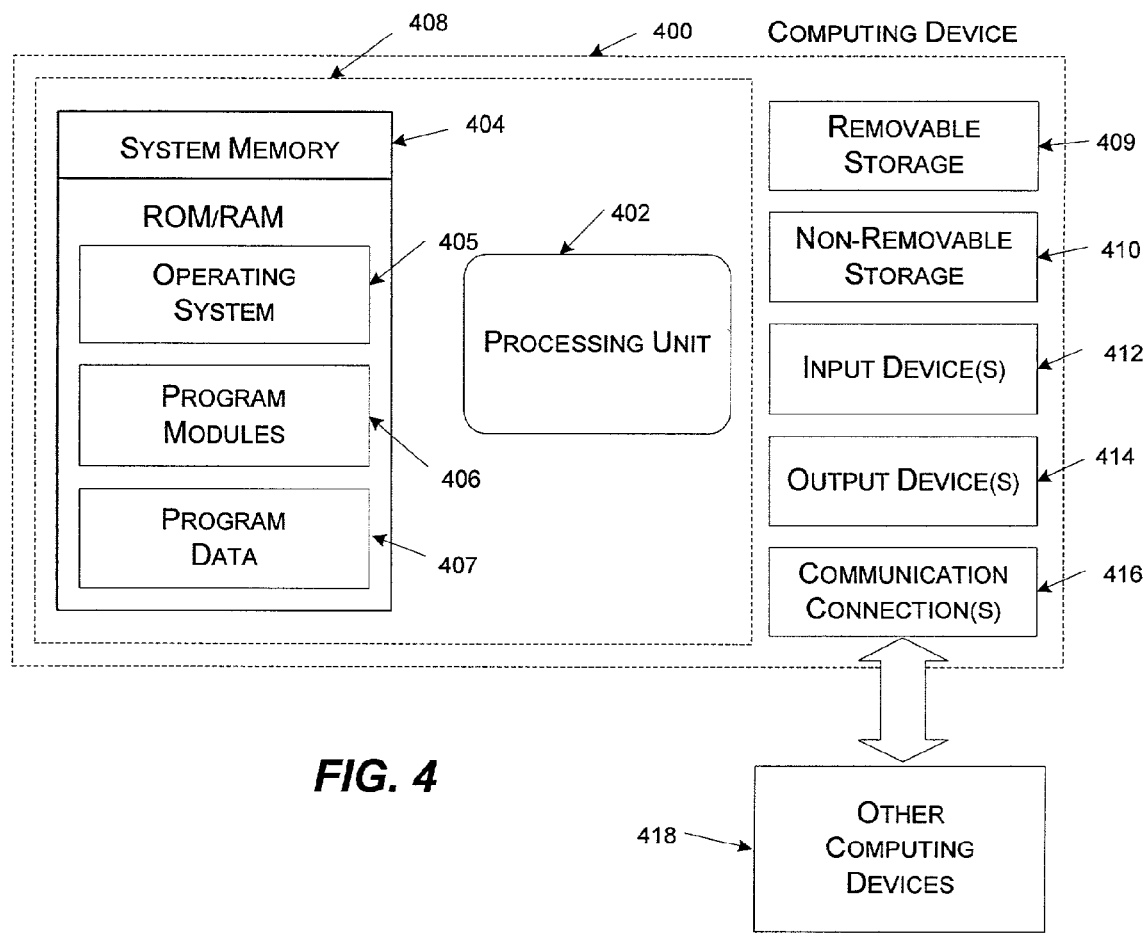
FIG. 4 illustrates an exemplary system for implementing the invention.

The present invention provides a structure and method for facilitating the synchronization of electronic devices. Among other things, disclosed is a protocol designed to synchronize devices over an unreliable, low bandwidth, and/or high latency network. The protocol allows multiple commands and responses to be grouped together in one message. It provides a mechanism for fetching a single object without synchronizing other objects during a synchronization activity. It is extensible and allows applications using it to embed additional commands to communicate with each other. First, an exemplary protocol providing the above features will be described. Then, a system and method using this protocol will be discussed.

Exemplary Protocol

In one exemplary embodiment of the invention, the protocol for synchronizing data is implemented as a series of extensible markup language (XML) documents designed to be sent between synchronizing devices. First a description of terms and syntax used in describing the protocol is disclosed. Then the structure of the protocol is described.

The format of the syntax following is to list a tag pair possibly followed by a colon and another tag pair, for example:

<Add> . . . </Add>:<Commands> . . . </Commands>

When a tag pair is listed with another tag pair, this indicates that the description applies when the first tag pair is on the next level from the second tag pair; otherwise, the description applies wherever the tag pair is found, unless otherwise noted. For this discussion, next level means that the tag is contained as one of one or more tags nested within the higher level tag. For example, in the XML document

```
<Sync>
    <Version>0.2</Version>
    <Collections>
        <Collection>
        . . .
        </Collection>
    </Collections>
</Sync>
``` the <Version> tag and the <Collections> tag are at the next level from the <Sync> tag. The <Collection> tag is at the next level from the <Collections> tag, but it is not at the next level for either the <Sync> or <Version> tags. Note that the indention of the example XML document shown above is not required to properly form an XML document. The example above could have been written as <Sync><Version>0.2</Version><Collections><Collection>
. . .
</Collection></Collections></Sync> and still be a valid XML document.

Following the tag pair, the number of allowed occurrences of the tag pair is specified. This is to be understood to mean that for this one exemplary embodiment of the invention, the information relating to occurrences is pertinent. Other embodiments may allow other numbers of tag pairs depending on design considerations and other factors.

Following the number of allowed occurrences is a description that may include examples of how the tag pair may be used. The description and examples are not intended to be all-inclusive and are included for illustrative purposes.

Following the description is a list of tags (or a list of no tags) that may be found at the next level from the current tag. This list of tags is to be understood to mean that for this one specific embodiment of the invention, the tag pairs listed may be found at the next level. Other embodiments may allow other tag pairs and exclude some of the listed tag pairs without departing from the spirit and scope of this invention.

It will be recognized that many tag names could be substituted for the ones given to provide equivalent functionally. Furthermore, tags could also be reordered and levels added or deleted without departing from the spirit and scope of this invention. With this introduction, the tags and descriptions will now be described.

<Sync> . . . </Sync>

Number Allowed: 1 per synchronization XML document.

Description: The <Sync> tag indicates the beginning of a sync XML document. In other words, when a parser encounters the <Sync> tag, this indicates to the parser that everything between the <Sync> tag and the </Sync> tag should be treated as a sync message. The <Sync> . . . </Sync> tags may be embedded in almost any type of document including email, ftp data, files passed from one computer to another, http data, etc. A system performing synchronization may scan each communication it receives to determine if a <Sync> . . . </Sync> tag pair is found. When the <Sync> . . . </Sync> tag pair is found, the system may extract an XML document defined by the <Sync> . . . </Sync> tag pair and pass it to a synchronization engine.

Tags that may be nested at the next XML level:

<Version> . . . </Version>

<Status> . . . </Status>

<Collections> . . . <Collections>

\<Version\> . . . \</Version\>

Number Allowed: 1.

Description: With this tag, two applications using the protocol can send to each other the version of the protocol that each application is using. The protocol does not require that the versions be similar; rather each application decides when, if, and how to proceed in the case of mismatched versions. Upon mismatched versions, an application may decide, for example, to use a prior version of the protocol when communicating with the other application.

Tags that may be nested at the next XML level: NONE.

\<Collections\> . . . \</Collections\>

Number Allowed: 1.

Description: The \<Collections\> tag indicates that one or more \<Collection\> . . . \</Collection\> tag pairs will follow. In one sense, the \<Collections\> . . . \</Collections\> tag pair "wraps around" a series of collection information.

Tags that may be nested at the next XML level:
   \<Collection\> . . . \</Collection\>

\<Collection\> . . . \</Collection\>

Number Allowed: 1—unbounded

Description: A \<Collection\> . . . \</Collection\> tag pair wraps around a collection of commands, responses, and related information. Typically, a \<Collection\> . . . \</Collection\> tag pair includes a batch of work and/or responses that is sent to the receiver. A \<Collection\> . . . \</Collection\> tag pair is used to batch a set of updates relating to one object type, such as calendar, contacts, etc., in one request. The protocol has no limitation on the number of \<Collection\> . . . \</Collection\> tag pairs that can be sent in one request.

Tags that may be nested at the next XML level:
   \<Class\> . . . \</Class\>
   \<SyncKey\> . . . \</SyncKey\>
   \<CollectionId\> . . . \</CollectionId\>
   \<Options\> . . . \</Options\>
   \<Commands\> . . . \</Commands\>
   \<Responses\> . . . \</Responses\>
   \<Status\> . . . \</Status\>
   \<GetChanges /\>
   \<WindowSize\> . . . \</WindowSize\>
   \<MoreAvailable /\>

\<Class\> . . . \</Class\>

Number Allowed: 1 for each collection.

Description: The \<Class\> . . . \</Class\> tag pair contains data that describes the type of object class that needs to be synchronized. Different objects may have different characteristics. For example, an appointment in a calendar has start time and end time as attributes, while a contact in an address book has a telephone number as an attribute. Using the class tag, the protocol may be used to inform the processing application as to what is being synchronized.

Tags that may be nested at the next XML level: NONE.

\<SyncKey\> . . . \</SyncKey\>

Number Allowed: 1 for each collection.

Description: The synchronization key included within the \<SyncKey\> . . . \</SyncKey\> tag pair is sometimes referred to as a watermark. Based on the synchronization key, an application can determine, for example, if the response or request is a retransmission. For example, the client may send a synchronization key of 1 together with synchronization data and commands. The server receives the synchronization key, processes the commands and data, and sends a response indicating success to the client. The response may not reach the client if, for example, a connection is lost. After waiting a period of time, the client may retransmit the data and use a synchronization key of 1 again. Because the synchronization key is 1, the server can determine that the client is retransmitting data and can check for items that were processed in the original message. On the other hand, if the client receives a response indicating success, it may then send a new message using a synchronization key of 2. Because the synchronization key is different, the server can determine that the information in this message is new.

Tags that may be nested at the next XML level: NONE.

\<CollectionId\> . . . \</CollectionId\>

Number Allowed: 1 for each collection.

Description: The collection ID contained within the \<CollectionId\> . . . \</ColleionId\> tag pair may be used to identify a collection, folder, or individual object. For example, the collection ID may identify an outbox of a user's mail system, or it may identify a single message contained within the outbox. If no collection ID is specified, a "default folder" may be used, depending on the data being synched and the systems using the protocol.

Tags that may be nested at the next XML level: NONE.

\<Options\> . . . \</Options\>

Number Allowed: 1 for every collection.

The \<Options\> . . . \</Options\> tag pair may be used to enclose data and/or commands that are ignored by the protocol and directed to an application either on the server or on the client. The protocol is designed to allow anything to be placed between the beginning \<Options\> tag and the ending \</Options\> tag. For example, an application may need to transmit a picture to another application. Binary data representing the picture in JPEG format could be sent by enclosing it in an \<Options\> . . . \</Options\> tag pair. Alternatively, the protocol could be "pseudo-expanded" in application-specific ways by including additional tag pairs and data within the \<Options\> . . . \</Options\> tag pair. For example, an application could request that a filter be placed on emails sent from the server to the client during a sync operation such that only emails with certain subject lines were sent. Alternatively, an application could request a certain truncation limit on emails such that only the first 1000 characters of each email are sent from the server to the client during a sync operation. A whole new protocol specific to the server and client could be placed within the \<Options\> . . . \</Options\> tag pair, without causing the synchronizing protocol to fail.

Tags that may be nested at the next XML level: Any, but they are not specifically recognized by this protocol.

\<Commands\> . . . \</Commands\>

Number Allowed: unbounded for every collection.

A \<Commands\> . . . \</Commands\> tag pair is used to enclose commands that are sent to an application either on the server or on the client. A \<Commands\> tag indicates that what follows are requests that need to be acted upon. For example, an add, delete, or change command together with associated data may be enclosed by the \<Commands\> . . . \</Commands\> tag pair. The protocol does not require that a \<Commands\> . . . \</Commands\> tag pair exist in a communication. For example, a client may request that a server not send any updates (by not sending a \<GetChanges /\> tag), in which case the server may forego sending any commands that may be contained in a \<Commands\> . . . \</Commands\> tag pair. When a \<Commands\> . . . \</Commands\> tag pair is present, however, it should contain at least one command.

Tags that may be nested at the next XML level:
   \<Add\> . . . \</Add\>
   \<Delete\> . . . \</Delete\>
   \<Change\> . . . \</Change\>
   \<Fetch\> . . . \</Fetch\>

Note, however, that at least one of the above tag pairs should be nested at the next XML level.

<Responses> . . . </Responses>

Number Allowed: unbounded for every collection.

A <Responses> . . . </Responses> tag pair is used to enclose responses to commands sent in a prior message. The protocol contemplates sending responses when failures are encountered in processing a command in a prior message or when a request is made that requires a response, such as a Fetch command. When no response to a command is sent, success may be assumed. Responses generally contain the request ID and a status parameter. For example, a command may request that a server delete an object identified by a particular ID. If the server cannot find the object identified, e.g. an invalid ID was given, the server may respond by sending information in a <Responses> . . . </Responses> tag that indicates that the object could not be found.

The protocol does not require that a <Responses> . . . </Responses> tag pair exist in a communication. For example, a server may successfully fulfill all the commands a client requests without any errors, in which case the server may forego sending any responses that may be contained in a <Responses> . . . </Responses> tag pair. When a <Responses> . . . </Responses> tag pair is present, however, it should contain at least one response to a prior request.

Tags that may be nested at the next XML level:
<Add> . . . </Add>
<Delete> . . . </Delete>
<Change> . . . </Change>
<Fetch> . . . </Fetch>

Note, that at least one of the above tag pairs should be nested at the next XML level.
<GetChanges />

Number Allowed: 1 for each collection.

Description: A <GetChanges /> tag is an empty tag that indicates that changes should be sent back to the requester. Generally, a client will send data to be updated to a server and request updated data be sent back to the client. To request updated data from the server, the client may use the <GetChanges /> tag; otherwise, the server should not send updated data when responding to updates sent from the client.

The protocol is designed to have the client, not the server, send a <GetChanges /> tag requesting updates. This allows a user on the client to dictate when changes from the server will be sent to the client. For example, a user using a mobile device synchronizing data over a wireless network to a server may desire that the server not have the capability of requesting that the mobile device send all data updates to the server. Rather, typically, the user desires to be in control of when to send data updates to the server so that such exchanges may be performed at the user's convenience.

Furthermore, the protocol is designed to include the <GetChanges /> tag in the last request when the client is submitting multiple requests in one session. This allows the server to process all requests before sending back updates.

Tags that may be nested at the next XML level: NONE.
<WindowSize> . . . </WindowSize>

Number Allowed: 1 for each collection.

The <WindowSize> . . . </WindowSize> tag pair contains a value that may be used to limit the number of updates sent from a server to a client. For example, a server may have received several new emails for a user since the last synchronization. If all the new emails are sent by the server, the user may be required to wait a relatively long time while the server sends updates to the user's mobile device. With this protocol, the user (or the user's mobile device) can specify how many updates from the server should be sent in each synchronization for each collection by selecting an appropriate window size for each collection. The server may send the specified number of updates to the user's mobile device and indicate that more updates are available for the collection by sending a <MoreAvailable /> tag, as described in more detail below.

Additionally, if the device is experiencing signal loss intermittently, it may dynamically reduce the window size. Then, if the signal is lost in the middle of a transmission, only a relatively small amount of data may need to be retransmitted.

Tags that may be nested at the next XML level: NONE.
<MoreAvailable />

Number Allowed: 1 for each collection.

The <MoreAvailable /> tag indicates that more updates are available for synchronization. The <MoreAvailable /> tag may be sent when a <WindowSize> . . . </WindowSize> tag pair has limited how many updates may be sent for a collection for a given synchronization. For example, if a server had ten emails that needed to be updated to the client and a client set a window size of four and engaged in a synchronization, the server could send four of the emails and a <MoreAvailable /> tag to indicate that more emails are available on the server for synchronization.

Tags that may be nested at the next XML level: NONE.
<Add> . . . </Add>: <Commands> . . . </Commands>

Number Allowed: unbounded.

A <Add> . . . </Add> tag pair contained between a <Commands> . . . </Commands> tag pair is used to add an object. The add information within the <Add> . . . </Add> tag pair identifies the object and data that should be associated with the object. For example, a client may send information to update a server's contact data information. In doing so, within a <Add> . . . </Add> tag pair the client may place an integer, such as 100, identifying the contact, and a first and last name of the contact, such as John Doe. Similarly, when the server sends a new object to the client, information is sent identifying the object and what data is associated with it. A <Add> . . . </Add> tag pair may also appear within a <Responses> . . . </Responses> tag pair as described below.

Tags that may be nested at the next XML level:
<ClientId> . . . </ClientId>
<ServerId> . . . </ServerId>
<ApplicationData> . . . </ApplicationData>
<Delete> . . . </Delete>: <Commands> . . . </Commands>

Number Allowed: unbounded.

A <Delete> . . . </Delete> tag pair contained between a <Commands> . . . </Commands> tag pair is used to delete an object. The delete information within the <Delete> . . . </Delete> tag pair identifies the object that should be deleted. For example, a client may send delete information to update a server's contact data information. In doing so, within a <Delete> . . . </Delete> tag pair the client may place an integer, such as 100, identifying the contact to be deleted (John Doe). Similarly, to delete an object from the client, the server sends information identifying the object to be deleted. A <Delete> . . . </Delete> tag pair may also appear within a <Responses> . . . </Responses> tag pair as described below.

Tags that may be nested at the next XML level:
<ServerID> . . . </ServerID>
<Change> . . . </Change>: <Commands> . . . </Commands>

Number Allowed: unbounded.

A <Change> . . . </Change> tag pair contained between a <Commands> . . . </Commands> tag pair is used to add an object. The change information within the <Change> . . . </Change> tag pair identifies the object and data that should be changed within the object. For example, a client may send information to update a server's contact data information. In doing so, within a <Change> . . . </Change> tag pair, the client may place an integer, such as 100, identifying the contact (John Doe), and a change of a first name, such as Jane. Similarly, when the server sends updates for an object to the client, information is sent identifying the object and what data is associated with it should be changed. A <Change> . . . </Change> tag pair may also appear within a <Responses> . . . </Responses> tag pair as described below.

Tags that may be nested at the next XML level:
<ServerId> . . . </ServerId>
<ApplicationData> . . . </ApplicationData>
<Fetch> . . . </Fetch>: <Commands> . . . </Commands>

A fetch tag indicates a request to get a specified object. For example, a user may configure a mobile device to retrieve only the email subject lines. During a synchronization, the mobile device may request that the server only send the email subjects, through for example a <Options><GetSubjectsOnly /></Options> syntax. (Note that this protocol ignores what is between the <Options> . . . </Options> tag pair, but the data between the pair can be passed to an application to "extend" the protocol as described in conjunction with the <Options> . . . </Options> tag pair described previously.) A user reading the email subject lines may desire to retrieve an entire email associated with one subject without waiting for other emails to be synchronized. By requesting the appropriate object through the use of the <Fetch> . . . </Fetch> tag pair and omitting the <GetChanges /> tag, the mobile device can have one object retrieved without having other objects sent from the server.

Tags that may be nested at the next XML level:
<ServerId> . . . </ServerId>
<Add> . . . </Add>: <Responses> . . . </Responses>

A <Add> . . . </Add> tag pair contained between a <Responses> . . . </Responses> tag pair is used to confirm adding an object and to update a client as to the server ID of the added object. For example, a client may send information to update a server's contact data information. In doing so, within a <Add> . . . </Add> tag pair the client may place an integer, such as 100, identifying the contact, and a first and last name of the contact, such as John Doe. When the server responds to the add update, it sends the client the client ID, e.g. 100, a server ID assigned to the new object, and the status of the update. This allows the client to make further updates to the object using the ID assigned by the server. A <Add> . . . </Add> tag pair may also appear within a <Commands> . . . </Commands> tag pair as described above.

Tags that may be nested at the next XML level:
<ClientId> . . . </ClientId>
<ServerId> . . . </ServerId>
<Status> . . . </Status>
<Delete> . . . </Delete>: <Responses> . . . </Responses>
Number Allowed: unbounded.

A <Delete> . . . </Delete> tag pair contained between a <Responses> . . . </Responses> tag pair may be used to report the status of deleting an object. The delete information within the <Delete> . . . </Delete> tag pair identifies the object that should be deleted. For example, a client may send delete information to update a server's contact data information. In doing so, within a <Delete> . . . </Delete> tag pair, the client may place an integer, such as 100, identifying the contact to be deleted (John Doe). If the deletion fails, for example if a contact object identified by 100 does not exist on the server, the server may respond to the deletion using a <Delete> . . . </Delete> tag pair and associated failure information within the pair.

Tags that may be nested at the next XML level:
<ServerID> . . . </ServerID>
<Status> . . . <Status>
<Change> . . . </Change>: <Responses> . . . </Responses>
Number Allowed: unbounded.

A <Change> . . . </Change> tag pair contained between a <Responses> . . . </Responses> tag pair is used to report the status of adding an object. For example, a client may send information to update a server's contact data information. In doing so, within a <Change> . . . </Change> tag pair, the client may place an integer, such as 100, identifying the contact (John Doe), and a change of a first name, such as Jane. If an error occurs in changing the data, for example, a contact associated with the ID cannot be found, the server may respond by placing within a <Change> . . . </Change> tag pair sent to the client the ID received, e.g. 100, and an error code indicating that the ID could not be found. A <Change> . . . </Change> tag pair may also appear within a <Commands> . . . </Commands> tag pair as described above.

Tags that may be nested at the next XML level:
<ServerId> . . . </ServerId>
<Status> . . . </Status>
<Fetch> . . . </Fetch>: <Responses> . . . </Responses>
Number Allowed: unbounded.

A <Fetch> . . . </Fetch> tag pair contained between a <Responses> . . . </Responses> tag pair is used to send a status and data associated with an object that was requested by a <Fetch> command issued in a <Commands> . . . </Commands> tag pair. For example, a user reading the email subject lines may desire to retrieve an entire email associated with one subject without waiting for other emails to be synchronized. The client the user is using may request from a server that the entire email be sent to the user by sending a <Fetch> . . . </Fetch> tag pair in a <Commands> . . . </Commands> tag pair identifying the object. The server may respond by sending an error status code, if, for example, the object requested is no longer available. Alternatively, the server may send the information requested by sending data within a <Fetch> . . . </Fetch> tag pair wherein the data identifies the object requested and data associated with the object.

Tags that may be nested at the next XML level:
<ServerId> . . . </ServerId>
<Status> . . . </Status>
<ApplicationData> . . . </ApplicationData>
<ClientId> . . . </ClientId>
Number Allowed: 1 for each <Add> . . . </Add> tag pair.

Information within the <ClientId> . . . </ClientId> tag pair identifies a specific object on a client. When the object is stored on a server, the server may associate a different object ID with the object. Typically, the client, the server, or a device between the client and server relaying messages between the two stores a mapping of client object IDs to server object IDs. The protocol contemplates having the client send the client object ID to the server when the client first requests that the object should be added on the server. Upon receipt of the object and ID, the server generates a server ID for the object and sends the client ID, the associated server ID, and the status of the add to the client, which then associates the ID with the object for future updating. Future updates regarding the object may then be referenced, either by the client or the server, by the server ID. For example, a user adds a new contact, e.g. John Doe, on the user's mobile device and then synchronizes the mobile device with a server. The mobile device assigns a client ID, e.g. 100, to the new contact, sends the new contact together with the client ID to the server, and receives a response from the server indicating which server ID, e.g. 752, was mapped to the client ID. The server ID is then used when the user updates information about the contact.

Tags that may be nested at the next XML level: NONE.
<ServerId> . . . </ServerId>

Number Allowed: 1 for each <Add> . . . </Add>, <Delete> . . . </Delete>, <Change> . . . </Change>, or <Fetch> . . . </Fetch> tag pair.

Information within the <ServerId> . . . </ServerId> tag pair identifies a specific object on the server. The ID assigned for the object by the server may or may not equal the ID assigned for the object by the client. More information related to server IDs is described in conjunction with the <ClientId> . . . </ClientId> tag pair above. In a system in which the client maintains a mapping of client IDs to server IDs, when a user desires to change a contact on the server, the user's client may send the server ID together with update data to the server to update the contact. For example, to change the name of the contact John Doe to Jane Doe, the user's client would send the server ID associated with John Doe, e.g. 752, together with name change information to the server.

Tags that may be nested at the next XML level: NONE.
<ApplicationData> . . . </ApplicationData>

Number Allowed: 1 for each <Add> . . . </Add> or <Fetch> . . . </Fetch> tag pair.

The <ApplicationData> . . . </ApplicationData> tag pair may be used to enclose data and/or commands that are sent to an application either on the server or on the client. The protocol is designed to allow anything to be placed between the beginning <ApplicationData> tag and the ending </ApplicationData> tag. In this respect, it is similar to the <Options> . . . </Options> tag pair described previously. For example, an application may need to transmit a picture to another application. Binary data representing the picture in JPEG format could be sent by enclosing it in an <ApplicationData> . . . </ApplicationData> tag pair. Alternatively, an application may send information to update contact information. Instead of requiring the application to send a complete new contact object, the protocol allows an application to send only the changed information. For example, an application changing the first name of contact John Doe may embed in an <ApplicationData> . . . </ApplicationData> tag pair information that identifies the attribute of the contact to be changed, e.g. <c:FirstName>Jane</c:FirstName>. Note that <c:FirstName> . . . </c:FirstName> tag pair is not specifically recognized by this protocol, but because of the nature of the <ApplicationData> . . . </ApplicationData> tag pair it could be embedded in the protocol to facilitate applications wanting such a method for updating contact information.

Tags that may be nested at the next XML level: Any, but they are not specifically recognized by this protocol.
<Status> . . . </Status>

The <Status> . . . </Status> tag pair may be used to enclose data relating to the success or failure of a requested operation. Such data could be a character string describing the status of the operation, e.g. Sync Server error, an integer corresponding to an error, e.g. 4153699, an alphanumeric string with characters and numbers, or any other data format. When an integer is used to report status, it may be broken into fields. For example, the first digits may correspond to the protocol being used, e.g. 4153 which is ASCII for "AS" which could be an abbreviation for AirSync protocol. Another field in the integer could correspond to the error type. The following table illustrates an example of some error types.

| Error Type | Number range |
|---|---|
| Informational | 100–199 |
| Success | 200–299 |
| Server error | 300–399 |
| Negotiation error | 500–599 |
| Application | 600–699 |
| Protocol error | 400–599 |
| Unknown | 999 |

Using the example prefix above (4153) and this table, one could define what particular integers stand for, for example, as follows:
Success=4153200
Access denied=4153300
Server timeout=4153301
Bad Version=4153500
Invalid SyncKey=4153501
AirSync protocol error=4153499
Sync Server error=4153399
Data Server error=4153699
Conversion error=4153601
Conflict=4153602
Unknown=4153999

Whether the application or the protocol parser handles the error is application specific. For example, the protocol parser may respond to an AirSync protocol error by requesting that the sender re-send the message. The application may determine what to do when a bad version is received. The application may, for example, cause the protocol parser to use a version compatible with the received version.

Tags that may be nested at the next XML level: NONE.

This ends the description of the syntax of the protocol. A careful study of the protocol will reveal that it enables the benefits described earlier. Specifically, the protocol allows multiple responses to be grouped together. Furthermore, the protocol allows commands to update data to be grouped together. In addition, groups of commands to update data and groups of responses to these commands may be grouped together in one XML document. Using the <Fetch> . . . </Fetch> tag pair and omitting the <GetChanges /> tag, the protocol enables a client to request that one object be sent without requiring a complete synchronization. Omitting a <GetChanges /> tag allows the client to send updates to the server without requiring the client to receives updates from the server. The <WindowSize> . . . </WindowSize> tag pair allows the client to request that only a certain number of updates be sent during a synchronization. The <MoreAvailable /> tag enables the server to indicate that more objects than the ones it sent are available. With the <Responses> . . . </Responses> tag pair being optional, the protocol allows responses to be sent for each object that fails in updating without being sent for each object that succeeds in updating, thus reducing the amount of information that must be transmitted. The <Options> . . . </Options> and the <ApplicationData> . . . </ApplicationData> tag pairs allow the protocol to be extended in application-specific ways.

FIGS. 1A–1C illustrate one exemplary syntax of a protocol for synchronizing devices. The syntax is provided in an XML schema language in which XML is used to define the grammar of acceptable XML documents allowed by this protocol. Note, that the schema does not describe the complete syntax of the protocol. Where the schema is deficient, comments have been added to the schema using a <!-- --> tag pair. For more information on specifying XML documents by using an XML schema, please see the home page of the World Wide Web consortium, presently maintained at http://www.w3..org.

FIGS. 2A and 2B illustrate an exemplary XML document sent by a client to synchronize data. FIGS. 3A and 3B illustrate an exemplary XML document sent in response to the XML document illustrated in FIGS. 2A and 2B. FIGS. 2A, 2B, 3A, and 3B are provided to illustrate an example of XML documents used for synchronizing data on a client and a server using the protocol disclosed herein.

Illustrative Computing Device

With reference to FIG. 4 an exemplary system for implementing the invention includes a computing device, such as computing device 400. In a very basic configuration, computing device 400 typically includes at least one processing unit 402 and system memory 404. Processing unit 402 includes existing physical processors, those in design, multiple processors acting together, virtual processors, and any other device or software program capable of interpreting binary executable instructions. Depending on the exact configuration and type of computing device, system memory 404 may be volatile (such as RAM), non-volatile (such as ROM, flash memory, etc.) or some combination of the two. System memory 404 typically includes an operating system 405, one or more program modules 406, and may include program data 407. This basic configuration is illustrated in FIG. 4 by those components within dashed line 408.

Computing device 400 may also have additional features or functionality. For example, computing device 400 may also include additional data storage devices (removable and/or non-removable) such as, for example, magnetic disks, optical disks, or tape. Such additional storage is illustrated in FIG. 4 by removable storage 409 and non-removable storage 410. Computer storage media may include volatile and nonvolatile, removable and non-removable media implemented in any method or technology for storage of information, such as computer readable instructions, data structures, program modules or other data. System memory 404, removable storage 409 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of device 400. Computing device 400 may also have input device(s) 412 such as keyboard, mouse, pen, voice input device, touch input device, etc. Output device(s) 414 such as a display, speakers, printer, etc. may also be included. All these devices are known in the art and need not be discussed at length here.

Computing device 400 may also contain communications connection(s) 416 that allow the device to communicate with other computing devices 418, such as over a network. Communications connection(s) 416 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Mobile Computing Device

Figure 5:
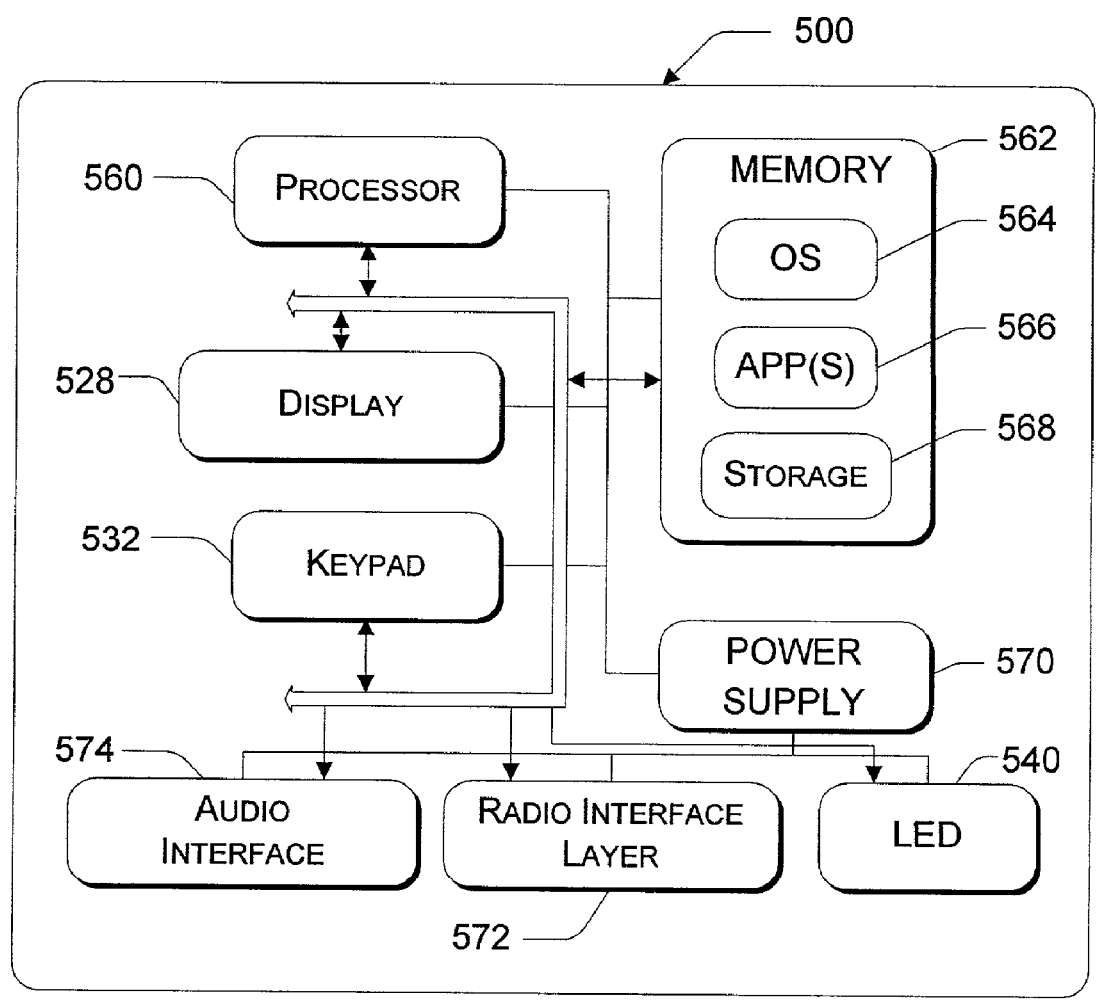
FIG. 5 is a functional block diagram illustrating functional components of a mobile computing device.

FIG. 5 is a functional block diagram illustrating functional components of a mobile computing device 500. The mobile computing device 500 has a processor 560, a memory 562, a display 528, and a keypad 532. The memory 562 generally includes both volatile memory (e.g., RAM) and non-volatile memory (e.g., ROM, Flash Memory, or the like). The mobile computing device 500 includes an operating system 564, such as the Windows CE operating system from Microsoft Corporation or other operating system, which is resident in the memory 562 and executes on the processor 560. The keypad 532 may be a push button numeric dialing pad (such as on a typical telephone), a multi-key keyboard (such as a conventional keyboard). The display 528 may be a liquid crystal display, or any other type of display commonly used in mobile computing devices. The display 528 may be touch sensitive, and would then also act as an input device.

One or more application programs 566 are loaded into memory 562 and run on the operating system 564. Examples of application programs include phone dialer programs, email programs, scheduling programs, PIM (personal information management) programs, word processing programs, spreadsheet programs, Internet browser programs, and so forth. The mobile computing device 500 also includes non-volatile storage 568 within the memory 562. The non-volatile storage 568 may be used to store persistent information which should not be lost if the mobile computing device 500 is powered down. The applications 566 may use and store information in the storage 568, such as email or other messages used by an email application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 568 synchronized with corresponding information stored at the host computer.

The mobile computing device 500 has a power supply 570, which may be implemented as one or more batteries. The power supply 570 might further include an external power source, such as an AC adapter or a powered docking cradle, that supplements or recharges the batteries.

The mobile computing device 500 is also shown with two types of external notification mechanisms: an LED 540 and an audio interface 574. These devices may be directly coupled to the power supply 570 so that when activated, they remain on for a duration dictated by the notification mechanism even though the processor 560 and other components might shut down to conserve battery power. The LED 540 may be programmed to remain on indefinitely until the user takes action to indicate the powered-on status of the device. The audio interface 574 is used to provide audible signals to and receive audible signals from the user. For example, the audio interface 574 may be coupled to a speaker for providing audible output and to a microphone for receiving audible input, such as to facilitate a telephone conversation.

The mobile computing device 500 also includes a radio interface layer 572 that performs the function of transmitting and receiving radio frequency communications. The radio interface layer 572 facilitates wireless connectivity between the mobile computing device 500 and the outside world, via a communications carrier or service provider. Transmissions to and from the radio interface layer 572 are conducted under control of the operating system 564. In other words, communications received by the radio interface layer 572 may be disseminated to application programs 566 via the operating system 564, and vice versa.

Illustrative Synchronization System

Figure 6:
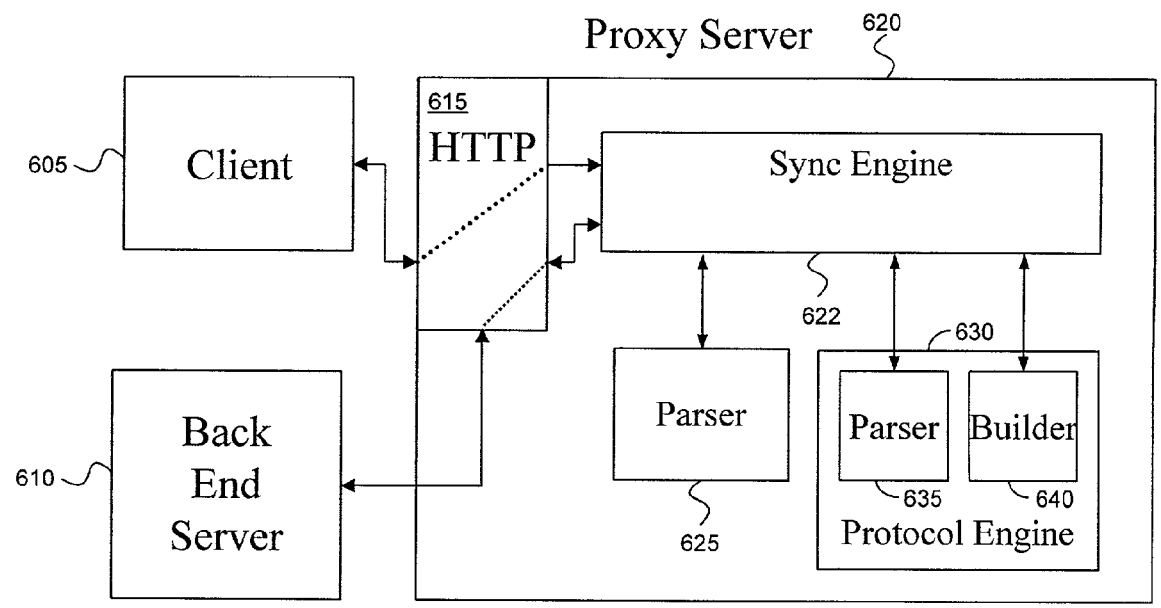
FIG. 6 is a functional block diagram illustrating a system adapted to synchronize data on a client and a server.

FIG. 6 is a functional block diagram illustrating a system adapted to synchronize data on a client and a server, according to one embodiment of the invention. The system includes client 605, back end server 610, and proxy server 620. Proxy server 620 includes hypertext transport protocol (HTTP) interface 615, sync engine 622, document parser 625, and protocol engine 630. Protocol engine 630 includes sync parser 635 and builder 640.

Client 605 is any device capable of sending information to or receiving information from a network. Such devices include personal computers, hand-held devices, multiprocessor systems, microprocessor-based or programmable consumer electronics, network PCs, minicomputers, mainframe computers, and the like. Client 605 may have many different applications residing on it for which synchronization is desired.

Back end server 610 may be a computing system as described in conjunction with FIG. 4. Typically, back end server 610 performs services and stores data for a set of clients. For example, back end server 610 may be used as a mail server that sends, receives, stores, and deletes email. In addition, back end server 610 may have various rules for processing email and may process email for multiple users.

HTTP interface 615 is used to send data across the Internet. HTTP interface 615 is typically built on top of (is sent using) other protocols such as transmission control protocol/internet protocol (TCP/IP). While HTTP interface 615 is typically used to transmit requests for Web pages from a browser and data from Web pages to a browser, it may be used to transmit other information.

Proxy server 620 may also be a computing system as described in conjunction with FIG. 4. Proxy server 620 acts as an interface between client 605 and back end server 610. Specifically, it translates requests from client 605 into requests back end server 610 can understand. It translates data back end server 610 returns into information suitable for client 605. It provides all necessary synchronization functions not provided in back end server 610. For example, back end server 610 may include a simple structured query language (SQL) database. Such a database can store data and retrieve data in response to SQL commands. An SQL database, however, does not typically respond to a protocol such as the protocol described in conjunction with FIGS. 3–5. For example, <GetChanges /> is not part of the SQL syntax. Thus, when a client, such as client 605, sends a request for changes, proxy server 620 translates this request into SQL syntax, queries the SQL database appropriately, builds an XML document in response, and sends the XML document to the client.

One of the advantages of the system shown in FIG. 6 is that back end server 610 may be replaced with a simple or sophisticated mail server without affecting client 605. To do this, proxy server 620 is programmed to communicate with back end server 610 and enabled to accomplish the synchronization features back end server 610 lacks.

Sync engine 622 may use document parser 625 to find commands and/or data sent from client 605 and back end server 610. For example, client 605 may send commands that are not part of the protocol described in this disclosure, such as a request to reply to an email for which client 605 has not received the full email (smart reply), a request to forward an email with its attachment for an email for which client 605 did not receive the attachment (smart forwarding), or a request to move a folder, such as a work-in-progress folder, from one place to another without retrieving all the objects in the folder.

Alternatively, client 605 may embed a <Sync> . . . </Sync> tag pair in a document. In this case, document parser 625 is used to extract the synchronization XML document contained within the <Sync> . . . </Sync> tag pair which sync engine 622 can then send to protocol engine 630 to extract synchronization information.

Protocol engine 630 uses sync parser 635 to extract synchronization commands, responses, and/or data which may then be sent to sync engine 622. For example, sync engine 622 may send an XML document to protocol engine 630 that contains multiple commands and responses. Then, sync engine 622 may repeatedly ask protocol engine 630 to return the next command or response with its associated data until all commands and responses have been processed. Protocol engine 630 passes the XML document to sync parser 635 and causes sync parser 635 to return commands and responses with associated data as required.

Similarly, protocol engine 630 uses builder 640 to build an XML document containing commands, responses, and/or data which may then be sent to sync engine 622. For example, sync engine 622 may request that protocol engine 630 begin building an XML document that sync engine 622 will send to client 605. Then, sync engine 622 may repeatedly send commands and responses together with data to protocol engine 630 that are to be placed in the XML document. Protocol engine 630 causes builder 640 to assemble the XML document including the commands and responses together with data and then sends the XML document to sync engine 622.

In another embodiment of the invention, proxy server 620 is not needed; rather, client 605 communicates directly with back end server 610. In this embodiment of the invention, client 605 and back end server 610 are able to send requests and receive responses using the protocol described in conjunction with FIGS. 3–5.

Figure 7:
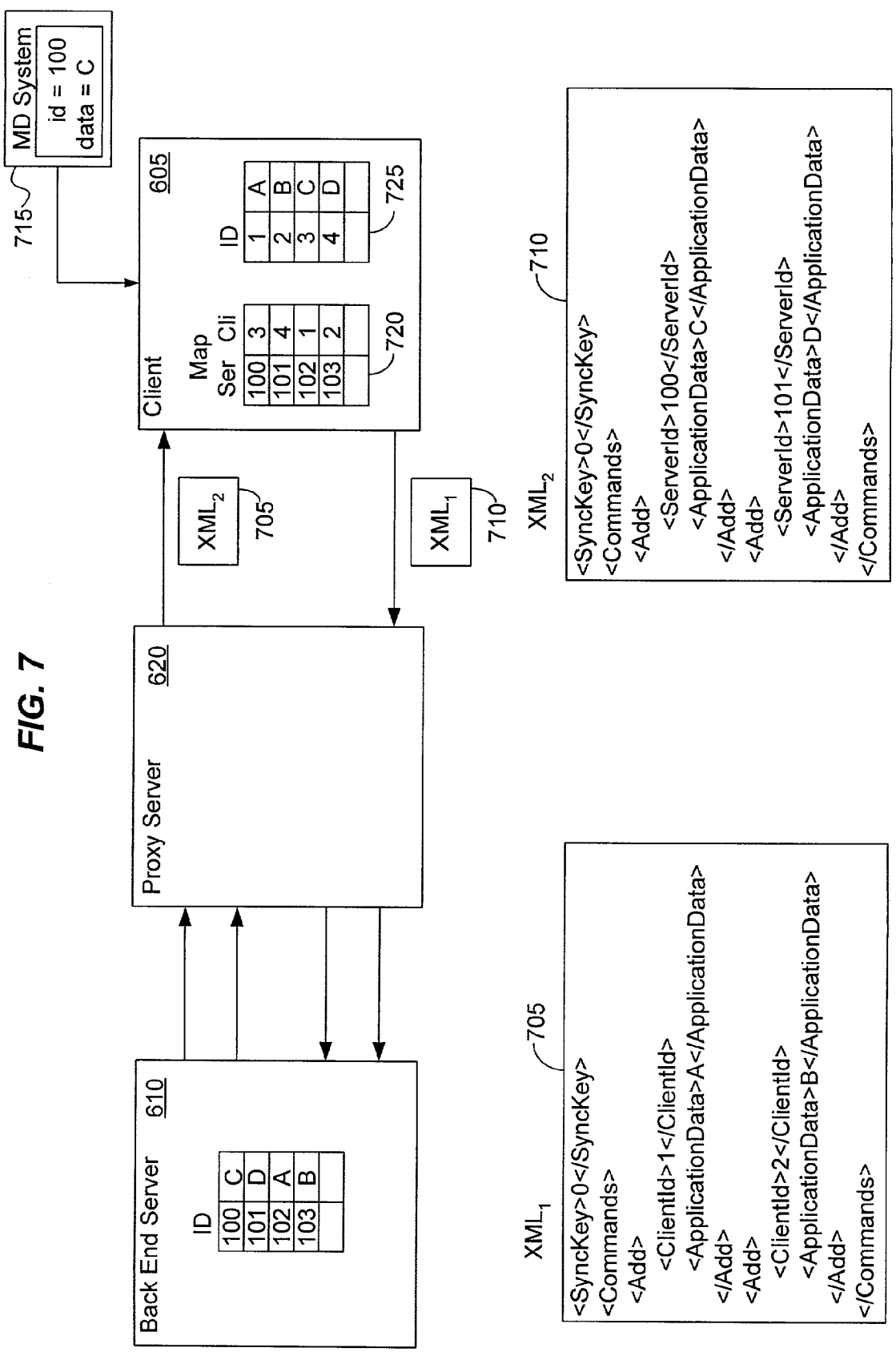
FIG. 7 is a functional block diagram illustrating a system adapted to synchronize data on a client and a server.

FIG. 7 is a functional block diagram illustrating a system adapted to synchronize data on a client and a server, according to one embodiment of the invention. The system includes client 605, back end server 610, proxy server 620 and message delivery system 715. Part of the operation of client 605, back end server 610, and proxy server 620 is described in conjunction with FIG. 6.

Message delivery system 715 may deliver data to client 605 out of band. That is, message delivery system 715 is not required to wait until client 605 requests updated data before it delivers data to client 605; rather, message delivery system 715 may deliver messages at any time to client 605, much like a pager. Such messages typically come from a server, such as back end server 610 and include a server ID and data. One example of an out of band message would be a message delivered using the Simple Messaging Service (SMS) or the like.

Client 605 includes map table 720 that maps server IDs to client IDs. Map table 720 is used when sending updates to and receiving updates from back end server 610. For example, client 605 may translate a client ID, such as client ID 1, to a server ID, such as server ID 102, and then send a request to update the server object associated with server ID 102. Additionally, if client 605 receives an update from server 610 or from message delivery system 715, client 605 may map the server ID received into the appropriate client ID and update the client object associated with the client ID. For example, when message delivery system 715 delivers an update associated with server ID 100, client 605 maps the server ID into client ID 3 and updates the client object associated with client ID appropriately.

Alternatively, client 605 may create mapping table 720 temporarily and delete it when not needed. For example, a user may add an object on client 605. Client may assign a client ID to the object and place it in object table 725. Client 605 may then create mapping table 720 and place the assigned client ID in it. Until client 605 synchronizes data with back end server 610, a server ID might not be associated with the new object. When client 605 synchronizes data with back end server 610, client 605 may receive a response indicating server IDs associated with each client ID. As each server ID is associated with a client ID, client 605 may replace client IDs associated with the objects in object table 725 with the server IDs received. Then, because each new object in mapping table 720 has been assigned a server ID, mapping table 720 may be deleted. Afterwards, client 605 may use the IDs in object table 725 to reference an object on back end server 610.

$XML_1$ document 705 and $XML_2$ document 710 are exemplary partial XML documents that may be sent between client 605 and proxy server 620 during a synchronization.

In another embodiment of the invention, proxy server 620 may contain a mapping table (not shown) that maps client IDs to server IDs. Proxy server 620 maintains its mapping table by monitoring messages between client 605 and back end server 610 and extracting pertinent information. For example, client 605 may send an update to add an object together with the ID client 605 has associated with the object. In response, back end server 610 may indicate that it has assigned the object a certain server ID. Proxy server 620 could use the client ID and the assigned server ID to update its mapping table.

In addition, periodically, mapping information could be shared with proxy server 620 so that it contains the most up-to-date mappings. For example, client 605 may receive a new object out of band from message delivery system 715. Client 605 may assign a client ID that is different from the server ID sent with the object. Afterwards, client 605 might send updates to the object to back end server 610 by sending the client ID and the changes requested. Because the original addition of the object occurred out of band, proxy server 620 may not know the server ID associated with the client ID sent. By maintaining a list of new objects obtained that proxy server 620 may not know the mapping for and by periodically informing proxy server 620 of mapping information, client 605 can avoid this problem.

A <Map> . . . </Map> tag pair may need to be added to the protocol disclosed to implement client/server mapping. For objects sent out of band, the tag pair could include client IDs associated with the server IDs sent with the objects.

Alternatively, out of band delivery to client 605 could be disabled. Then, periodic sharing of mapping information may not be necessary; rather, proxy server could gain mapping information by processing communications between client 605 and back end server 610.

When proxy server 620 maintains mapping information, client 605 may send updates to back end server 610 through proxy server 620 by referencing the object with a client ID. Proxy server 620 could then translate the client ID to a server ID using the mapping table. In its interactions with back end server 610 related to the object, proxy server 620 would use the server ID associated with the object. In its interactions with client 605, proxy server 620 would use the client ID associated with the object. Storing a mapping table on the proxy avoids the storage that may be required on a client device for a similar mapping table.

Figure 8:
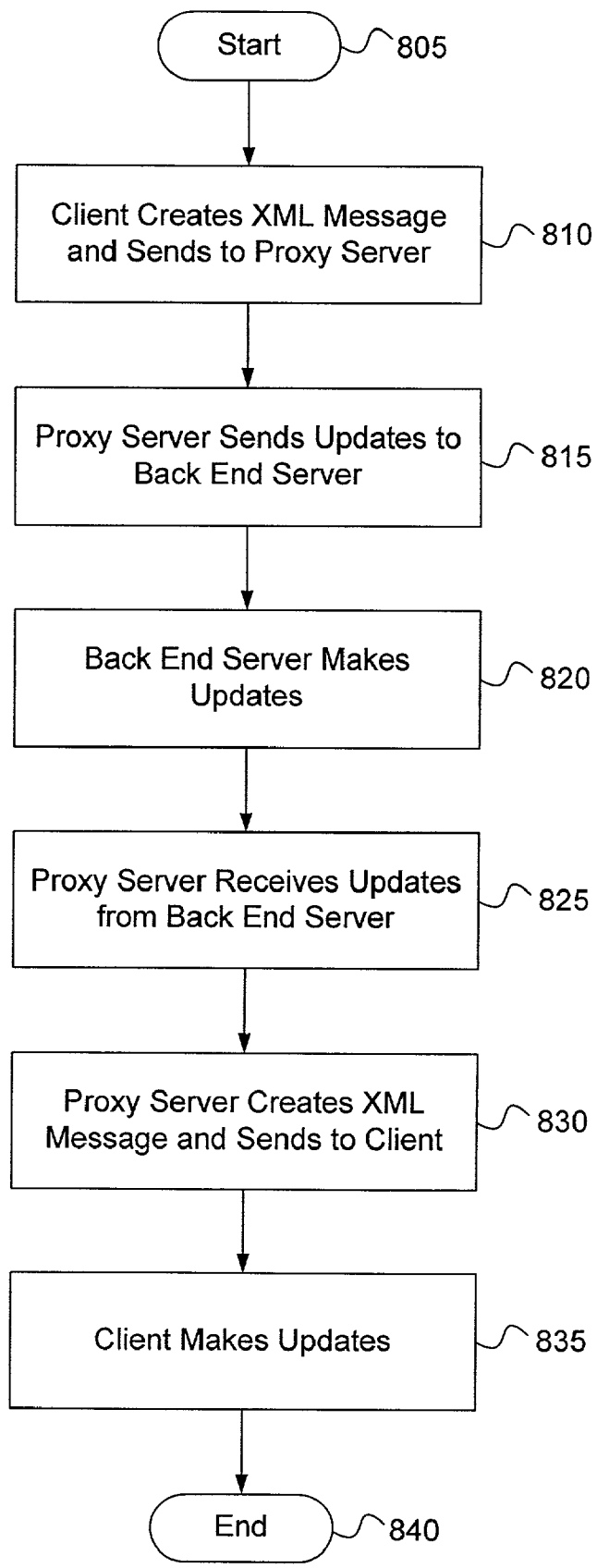
FIG. 8 is a logical flow diagram illustrating a process for performing a synchronization using the protocol disclosed in accordance with the invention.

FIG. 8 is a logical flow diagram illustrating a process for performing a synchronization using the protocol disclosed. In describing FIG. 8, reference is made to the system described in conjunction with FIG. 7. The process starts at block 805 when data is ready to be synchronized between a client, such as client 605, and a back end server, such as back end server 610. At this point, map table 720 is empty and client object table 725 contains the objects associated with client IDs 1 and 2. Back end server 610 contains objects associated with server IDs 100 and 101. For purposes of this example, it is also assumed that client 605 and back end server 610 have not previously synchronized data.

At block 810, the client creates an XML document that contains changes that have occurred since the last synchronization. Because the client and the back end server have not synchronized data before, this XML document contains objects that have been created on the client that are being synchronized. For example, referring to FIG. 7, client 605 creates an XML document similar to $XML_1$ document 705. This document essentially states that the server should add objects corresponding to the objects associated with client IDs 1 and 2. Then, client 605 sends this $XML_1$ document 705 to proxy server 620.

At block 815, the proxy server uses the XML document sent to update the back end server and request any other information requested in the document. For example, proxy server 620 sends two updates to back end server 610 corresponding to the two objects contained in $XML_1$ document 705.

At block 820, the back end server makes the updates requested by the proxy server. For example, back end server 610 adds the two objects, e.g. A and B, and assigns a server ID to each, e.g. 102 and 103.

At block 825, the proxy server receives any updates and commands that the back end server has. Additionally, typically the back end server sends the proxy server a server ID for each new object the back end server adds. The proxy server may report to the client each server-assigned ID, together with the ID the client associated with the object. This allows the client to update its mapping table (or discard a temporary mapping table, replace the client ID with the assigned server ID, and use the server ID for future references) so that it may send future updates to these newly added objects using the IDs the server associated with the objects. For example, proxy server 620, receives two objects, C and D, from back end server 610 together with the server IDs associated with the objects, e.g. 100 and 101. Proxy server 620 also queries back end server 610 for the IDs of the client objects it previously added, e.g. A and B, and finds that the server assigned server ID 102 to object A and server ID 103 to object B.

At block 830, the proxy server creates an XML document to send to the client containing responses to the updates the client previously sent as well as any commands and/or updates the server is sending to the client. For example, referring to FIG. 7, proxy server 620 creates an XML document that includes the information found in $XML_2$ document 710. $XML_2$ document 710 is only part of the XML document proxy server 620 would typically send to client 605. Generally, the XML document would also include, among other things, server IDs together with the client IDs they mapped to for objects the client added when sending its most recent updates. After creating XML₂ document 705, proxy server 620 sends it to client 720.

At block 835, the client receives the XML document, determines what to do with any errors, and makes any updates appropriate. For example, referring to FIG. 7, client 605 receives XML₂ document 705 and adds objects C and D to client object table 725. Client 605 also updates mapping table 720 with server IDs 100-103 together with the client IDs to which these IDs map.

At block 840, processing ends. At this point, a synchronization has occurred between the client and the back end server. Furthermore, the client has updated its mapping table so that it may use the server IDs for changes to the objects. When the client synchronizes again, it may do so by repeating the above steps.

The various embodiments of the invention are implemented as a sequence of computer-implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit and scope of the present invention as recited within the claims attached hereto.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium having a data structure and computer-executable instructions stored thereon for synchronizing an object between a server and a client, the data structure comprising:
   a synchronization message including message portions for grouping synchronization request activities and synchronization response activities in a single message, wherein the synchronization request activities include commands to update data and the synchronization response activities include responses to previous commands to update data, wherein the message portions include:
      a version portion of the synchronization message for indicating a protocol version of the synchronization message for synchronizing the object;
      a command portion of the synchronization message for indicating a synchronization action to synchronize the object between the server and the client; and
      a response portion of the synchronization message for indicating a synchronization action error.

2. The computer-readable storage medium of claim 1, wherein the command portion includes a fetch portion for identifying an object to be synchronized.

3. The computer-readable storage medium of claim 2, wherein the fetch portion indicates that the object is the only object to be synchronized.

4. The computer-readable storage medium of claim 1, wherein the command portion includes a window size portion for indicating a maximum number of objects to synchronize.

5. The computer-readable storage medium of claim 1, wherein the command portion includes a more available portion far indicating that more objects are available to synchronize.

6. The computer-readable storage medium of claim 1, further comprising an options portion that includes a second synchronization message.

7. The computer-readable storage medium of claim 6, wherein the second synchronization message is configurable to send a second set of commands between the client and the server.

8. The computer-readable storage medium of claim 6, wherein the second synchronization message is configurable to send data between the client and the server.

9. The computer-readable storage medium of claim 1, further comprising a get changes portion that requests the server to send updates to the client.

10. The computer-readable storage medium of claim 1, further comprising a response portion that includes a server ID that the sewer associated with the object when the client sends an object for addition to the server.

11. The computer-readable storage medium of claim 10, wherein the response portion includes a client ID that the client sent with the object.

12. The computer-readable storage medium of claim 1, wherein the object is associated with more objects to be synchronized.

13. The computer-readable storage medium of claim 1, wherein the synchronization message is grouped with a second synchronization message to form the single message.

14. The computer-readable storage medium of claim 1, wherein the synchronization message is associated with an email.

15. The computer-readable storage medium of claim 1, wherein the synchronization message is transmitted using a hypertext transport protocol.

16. The computer-readable storage medium of claim 1, wherein the command portion includes an object data portion having object update data.

17. The computer-readable storage medium of claim 1, further comprising a status portion for indicating a status of the synchronization action.

18. The computer-readable storage medium of claim 1, wherein the synchronization message further comprises;
   a second command portion for indicating a second synchronization action to synchronize a second object between the server and the client; and
   a second response portion for indicating tat the second synchronization action was unsuccessful when an error occurs.

19. The computer-readable storage medium of claim 18, wherein the synchronization message further comprises an information response portion that includes requested information when the client requests information from the server.

20. The computer-readable storage medium of claim 1, wherein the synchronization message further comprises an information response portion that includes requested information when the client requests information.

21. A system for synchronizing an object, comprising:
   a server configured to receive a synchronization message from a mobile device, wherein the synchronization message includes portions for grouping synchronization request activities and synchronization response activities in a single synchronization message, wherein the synchronization request activities include commands to update data and the synchronization response activities include responses to previous commands to update data, wherein the portions include:
- a version portion of the synchronization message for indicating a version of the synchronization message for synchronizing the object;
- a command portion of the synchronization message for indicating a synchronization action to take to synchronize the object.

22. The system of claim 21, wherein the server is configured to send a second synchronization message having:
- a second version portion of the second synchronization message for indicating a version of the second synchronization message for synchronizing the object;
- a response portion for indicating an error when an error is associated wit the synchronization action.

23. The system of claim 22, wherein the response portion is omitted from the synchronization message when an error is not associated with the synchronization action.

24. The system of claim 22, wherein the second synchronization message further comprises an information response portion for requested information when the mobile device requests information.

25. The system of claim 23, wherein the second synchronization message comprises a command portion for indicating a second synchronization action to synchronize a second object between the server and the mobile device.

26. The system of claim 24, wherein the server is further configured to update data on a second server using the synchronization message.

27. The system of claim 26, wherein the server is a proxy server.

28. The system of claim 27, wherein the proxy server associates an object on the mobile device with an object on the second server.

29. A mobile device having a data store and computer-executable instructions stored on computer storage medium, the computer-executable instructions, comprising:
- formatting a synchronization message having message portions for grouping synchronization request activities and synchronization response activities in a single message, wherein the synchronization request activities include commands to update data and the synchronization response activities include responses to previous commands to update data, wherein the message portions include:
  - a version ID portion indicating a version of a synchronization protocol;
  - a commands portion defining server changes for causing data on the server to synchronize with data on the data store; and
- transmitting the synchronization message to the server.

30. The device of claim 29, wherein the synchronization message further includes a response portion for indicating the synchronization was unsuccessful when an error occurs.

31. The device of claim 30, wherein the synchronization message further includes an information response portion that includes the requested information when the mobile device requests information.

32. The device of claim 30, wherein the commands portion includes a fetch portion fur identifying an object located on the server for updating the mobile device.

33. The device of claim 30, wherein the commands portion includes a window size for indicating a maximum number of objects for the server to synchronize.

34. A server having a data store and computer-executable instructions, the computer-executable instructions, comprising:
- receiving an update synchronization message having message portions for grouping synchronization request activities and synchronization response activities in a single message, wherein the synchronization rawest activities include first commands to update data and the synchronization response activities include responses to previous commands to update data, wherein the message portions include:
  - a first version ID portion for indicating a version of a synchronization protocol;
  - a first commands portion defining sewer changes for causing the data store to he synchronized with data on a mobile device;
- sending a response synchronization message having message portions for grouping synchronization request activities and synchronization response activities in a single message, wherein the synchronization request activities include second commands to update data and the synchronization response activities include responses to the first commands to update data, wherein the message portions include:
  - a second version ID portion for indicating a version of a synchronization protocol;
  - a second commands portion defining mobile device changes for causing the data store to be synchronized with data on the mobile device; and
  - a response portion for indicating that synchronization was unsuccessful when an error occurs during processing of the update synchronization message.

35. The server of claim 34, farther comprising:
- a parser for parsing the update synchronization message; and
- a generator for generating the response synchronization message.

36. The server of claim 35, wherein the update synchronization message and the response synchronization message include a markup language.

37. The server of claim 36, wherein the markup language includes an extensible markup language.

* * * * *